Aug. 14, 1934.  W. LEONARD  1,969,807
TIRE RIMMING TOOL
Filed May 28, 1932

Inventor
Walter Leonard
By George L. Ljunglof
Attorney

Patented Aug. 14, 1934

1,969,807

UNITED STATES PATENT OFFICE 1,969,807

TIRE RIMMING TOOL

Walter Leonard, Malverne, N. Y.

Application May 28, 1932, Serial No. 614,087

2 Claims. (Cl. 157—6)

This invention relates to a novel tool to facilitate mounting and demounting of pneumatic tires with reference to vehicle wheel rims, and it refers more particularly to a hand tool for use in mounting and demounting large tires of the straight-side type.

One object of the invention is to provide an efficient hand tool which will greatly reduce the labor necessary, and will greatly expedite the changing of large size tires such as are used on heavy motor trucks, tractors, trailers, busses and the like.

Another object is to provide such a tool which will be of extremely simple construction and capable of being manufactured at low cost.

Other objects, features and advantages of the invention will become apparent from reading the following description in connection with the accompanying drawing, wherein one form of the invention has been shown by way of illustration, and wherein Figure 1 is a fragmentary sectional perspective view of a conventional tire and rim construction for which the novel tool is adapted to be used;

Similar reference characters designate corresponding parts throughout the several views of the drawing.

As is well known to those skilled in the art to which this invention relates, pneumatic tires for vehicle wheels are usually disposed upon so-called demountable rims, such rims being pretty well standardized though produced with variations in minor details by a number of different manufacturers. These rims are, of course, annular and of such width and diameter as properly to seat a tire with its inflating tube, and each rim is further provided with suitable means for fastening it to a wheel felloe but as to the details of which we are not here concerned. In the type of rim which is very extensively used, there is a removable, annular bead ring at one side which is held in place by a split locking ring, the rim, bead ring and locking ring being so constructed as to cooperate with each other in maintaining perfect assembly when in use.

Figure 1:
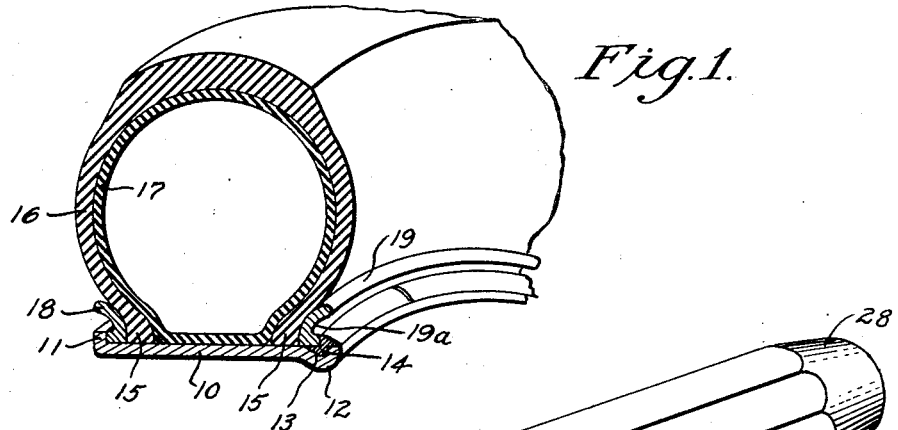
Figure 2:
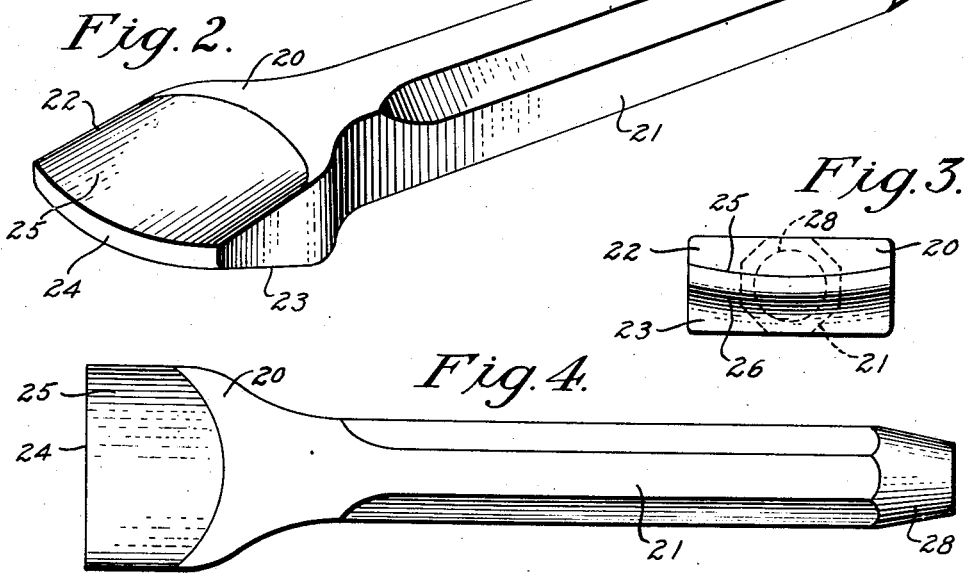
Fig. 2 is a perspective view of one form of the novel tool, per se.
Figure 3:
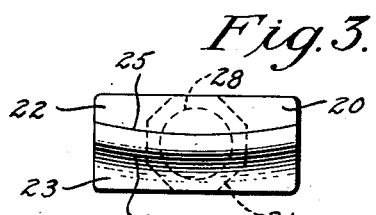
Fig. 3 is an end view thereof.
Figure 4:
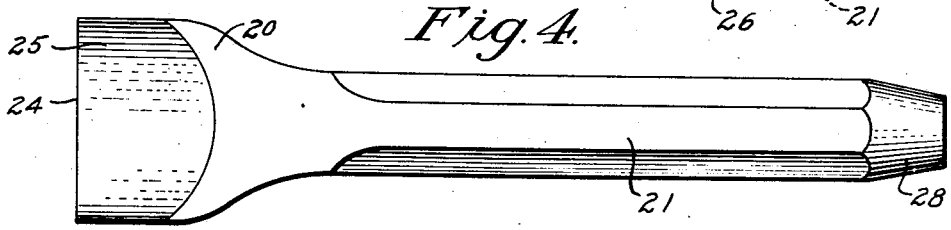
Fig. 4 is a plan view of the same.
Figure 5:
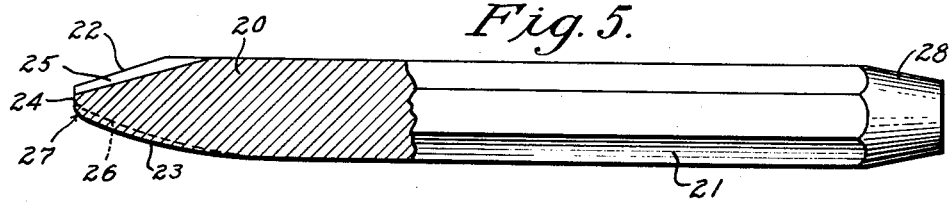
Fig. 5 is a side view of the same, partly in longitudinal section.

One of such rims, with a tire and tube, is illustrated conventionally in Fig. 1 of the accompanying drawing, to which reference may now be had. In this view the body portion 10 of the rim is provided at one side with a small outwardly extending annular flange 11, and at the other side with an inward offset 12, which forms an annular groove or recess 13 for snugly receiving a portion of a locking ring 14. The outer surface of the rim 10 is cylindrical and of a diameter equal to the inner peripheries of the bead portions 15 of the tire 16 which is adapted to be inflated by an endless inner tube 17 of any ordinary or preferred type. The bead portions 15 of the tire are provided with inextensible reinforcements (not shown) and are characterized by relatively straight outer sides which are adapted to be engaged and confined by outwardly-flaring, endless bead rings 18 and 19. The position of the bead ring 18 is defined by the rim flange 11, while the bead ring 19 is maintained in its proper spaced relation to the ring 18 by the upper or outer portion of the locking ring 14.

In the illustrated embodiment thus far described, the locking ring 14 is shown as being substantially of reverse Z-shape in cross-section, part of it within the groove 13 being overlapped by part of the base of the bead ring 19, and part of it extending above or outwardly of the outer surface of the rim 10 to provide an annular shoulder for locating said bead ring 19. It is to be understood, however, that the novel tool forming the subject-matter of my invention is not limited in use to rims having this specific form of locking ring, but may be used on any rim of this general type, regardless of variations in minor details.

Prior to my invention, the changing of a tire on one of these rims (and particularly in the larger sizes) has been a very laborious operation, requiring upward of two hours in tiresome and exasperating effort. The tire can only be removed by an axial movement on the rim 10, but first it is necessary to take off the lock-ring 14 and bead ring 19. Since these two rings are so intimately associated, it becomes necessary first to drive the bead ring 19 axially inward so as to clear the locking ring 14, such movement being resisted to a substantial degree by the adjacent bead 15 of the tire. In some instances, after the tire has been in use for some time, such displacement of the bead ring and removal of the locking ring has been rendered more difficult by the binding action of rust and dirt on the rim. My simple hand tool enables a mechanic to easily and quickly perform this operation.

Referring now particularly to Figs. 2 to 5, inclusive, it will be seen that the novel tool therein shown comprises an impact member 20 and a handle 21 for convenience in manipulation. In this embodiment the members 20 and 21 are unitarily formed from a single piece of any material suitable for the purpose and capable of withstanding and transmitting impacts as from a hammer. A hardwood, such as oak or maple, might be used if desired but I prefer to employ wrought iron or steel because of their much longer wearing qualities, and because they can easily be worked in drop forgings on a quantity production basis. At any rate, I do not intend to limit myself to the selection of any specific material.

The impact member 20 is preferably wider than the handle 21 and is longitudinally tapered on its upper and lower surfaces 22 and 23, whereby to provide a relatively thin, blunt end 24. This blunt end 24 is adapted to engage against the recessed portion 19a of the bead ring 19 in a manner to be hereinafter more fully explained. The impact member 20 is further characterized by being curved in transverse section, the upper surface 22 being concave, as indicated at 25 (see Fig. 3), while the lower surface is convex, as indicated at 26. The mean diameter of this concavo-convex formation is approximately equal to the mean diameter of the bead ring 19 on which the tool is adapted to be used, and from this it will be evident that the full extent of the blunt end 24 will be capable of engagement with the bead ring so as to distribute the impact forces over a substantial surface thereof without likelihood of doing any damage thereto. If desired, the end corner of the lower surface 23 may be slightly rounded, as indicated at 27, so as more properly to fit into the recessed portion 19a of the bead ring.

The handle portion 21 has been illustrated as octagonal in cross section, though obviously this is a structural detail which may be varied in many ways without affecting the utility of the tool as a whole. Furthermore, this handle portion has been shown tapered, as at 28, at the end opposite the impact member 20 and this, too, is a detail which may be varied according to choice in manufacture.

In the use of the tool to facilitate removal of the tire 16 from the rim 10, it will be grasped by the handle 21 in one hand of the mechanic and the blunt end 24 placed in the recess 19a of the bead ring 19, with the concave side 25 innermost with reference to the axis of the wheel. Holding the tool thus firmly in place, the mechanic will then drive the other end of it with a hammer or the like, operating successively at different spaced points around the bead ring 19 and thus will move said bead ring and with it the adjacent bead 15 toward the bead ring 18, until the locking ring 14 has been freed. Thereupon the locking ring may easily be pried out of the rim groove 13 and entirely removed so as to be out of the way of the bead ring 19. Thereafter, the bead ring 19 and the tire 16, with its inner tube 17, can be slid axially off the rim 10, giving access to the interior of the tire for inspection, repair or replacement of the inner tube.

When a tire is to be mounted upon a rim, the operation is reversed, as can readily be understood. In other words, the tire with its inner tube in place will be slid on to the rim 10 and thereafter the bead ring 19 will be positioned, and with the aid of the novel tool, it will be moved inwardly a sufficient distance to permit the placement of the locking ring 14. Of course, when the inner tube 17 is inflated, it has a tendency to spread the beads 15 apart, whereby to maintain the proper contact between the sides of the bead and the bead rings 18 and 19. In such condition, it is impossible for the locking ring 14 to become accidentally displaced because of its cooperative relation to the bead ring 19. In some instances, the novel tool constituting the present invention will not only be used to loosen and move the bead ring 19, but will also be similarly used in contact with portions of the locking ring 14.

Extensive testing and actual use of this novel tool have demonstrated its practical utility in very greatly reducing the time and labor necessary for changing a tire, and this is particularly true for operations upon large size bus and truck tires, as previously referred to.

Figure 6:
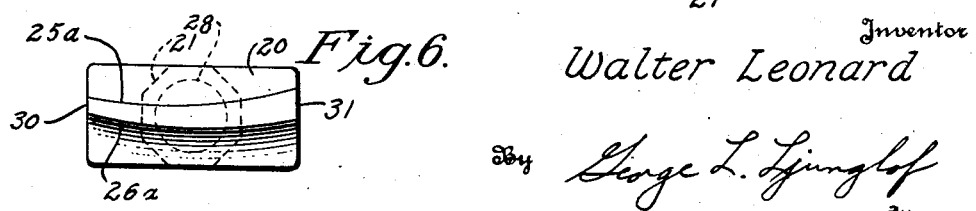
Fig. 6 is an end view of a slightly modified form of the invention.

The invention is, of course, susceptible of many modifications in its minor details of construction, one such modification being shown in Fig. 6 of the drawing. In this form of the invention, the concave and convex surfaces 25a and 26a, respectively, are eccentrically arranged so as to provide wide edges 30 and 31 of different dimensions. In other words, there is what might be termed a "transverse" taper, as well as a longitudinal taper and this arrangement is desirable in some instances to more effectively produce a prying action in the use of the tool. Obviously, other changes may be resorted to in the details of construction and arrangement of parts, and the right is herein reserved to make such changes as fall within the scope of the appended claims without departing from the spirit of the invention.

Having thus described my invention, what I claim is:

1. A tire tool of the class described having an impact member of greater width than thickness and adapted to engage endwise against a bead ring of a tire-mounting rim, said impact member being tapered to a relatively thin, blunt end, and being concavo-convex in transverse section, the mean radius of such transverse curvature being substantially equal to that of the bead ring.

2. A tire tool of the class described formed of a single piece of material and comprising a handle portion and an impact portion at one end thereof, said impact portion being of increased width and tapering to a relatively thin, blunt end adapted for substantial engagement with a bead ring of a tire-mounting rim, said impact portion being further characterized by a concavo-convex form in its transverse section, the mean radius of such transverse curvature being approximately the same as that of the bead ring.

WALTER LEONARD.